March 15, 1938.  W. K. BURGESS  2,110,865
AMPHIBIAN AIRCRAFT
Filed Jan. 19, 1937  6 Sheets-Sheet 1
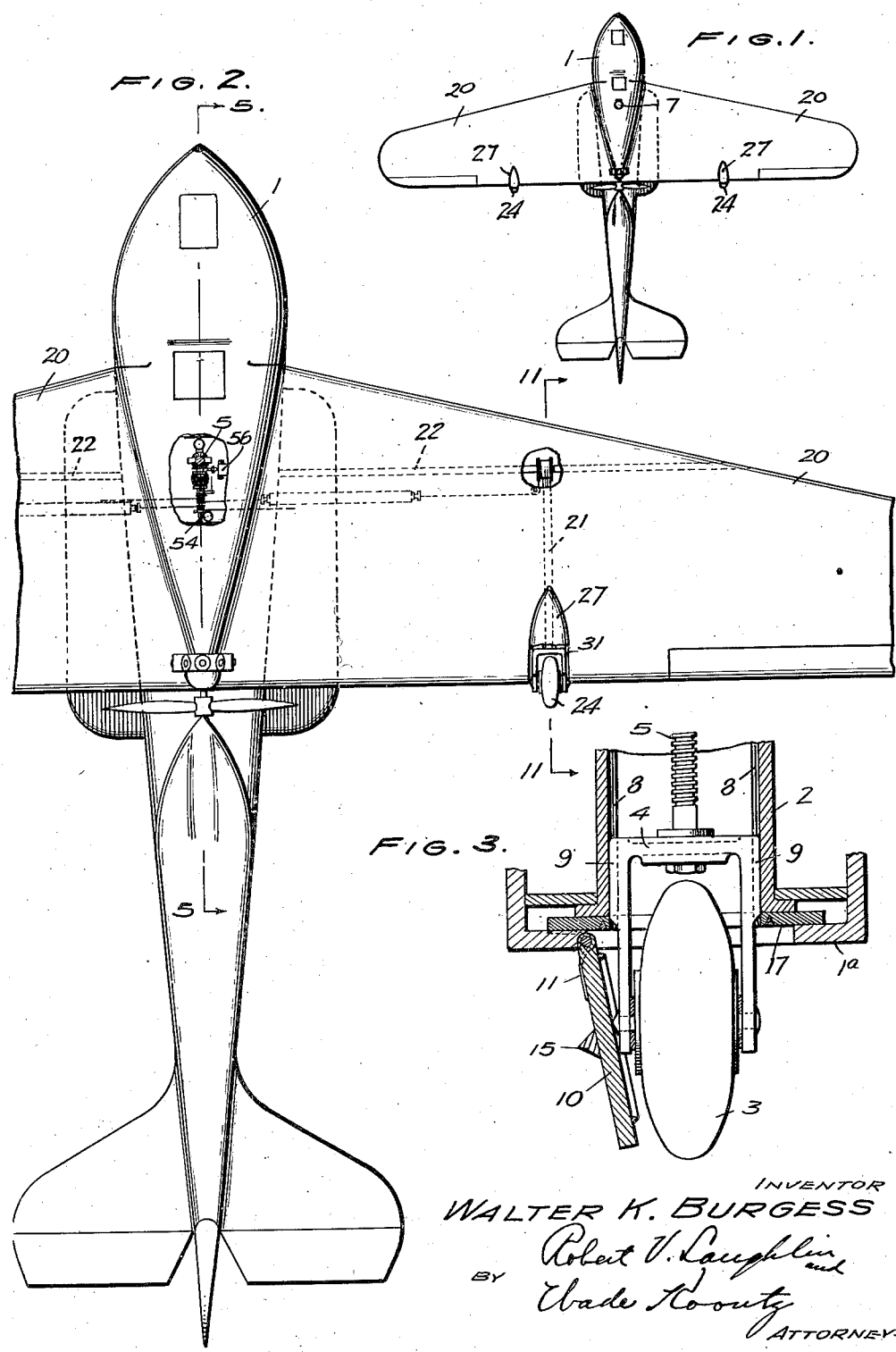

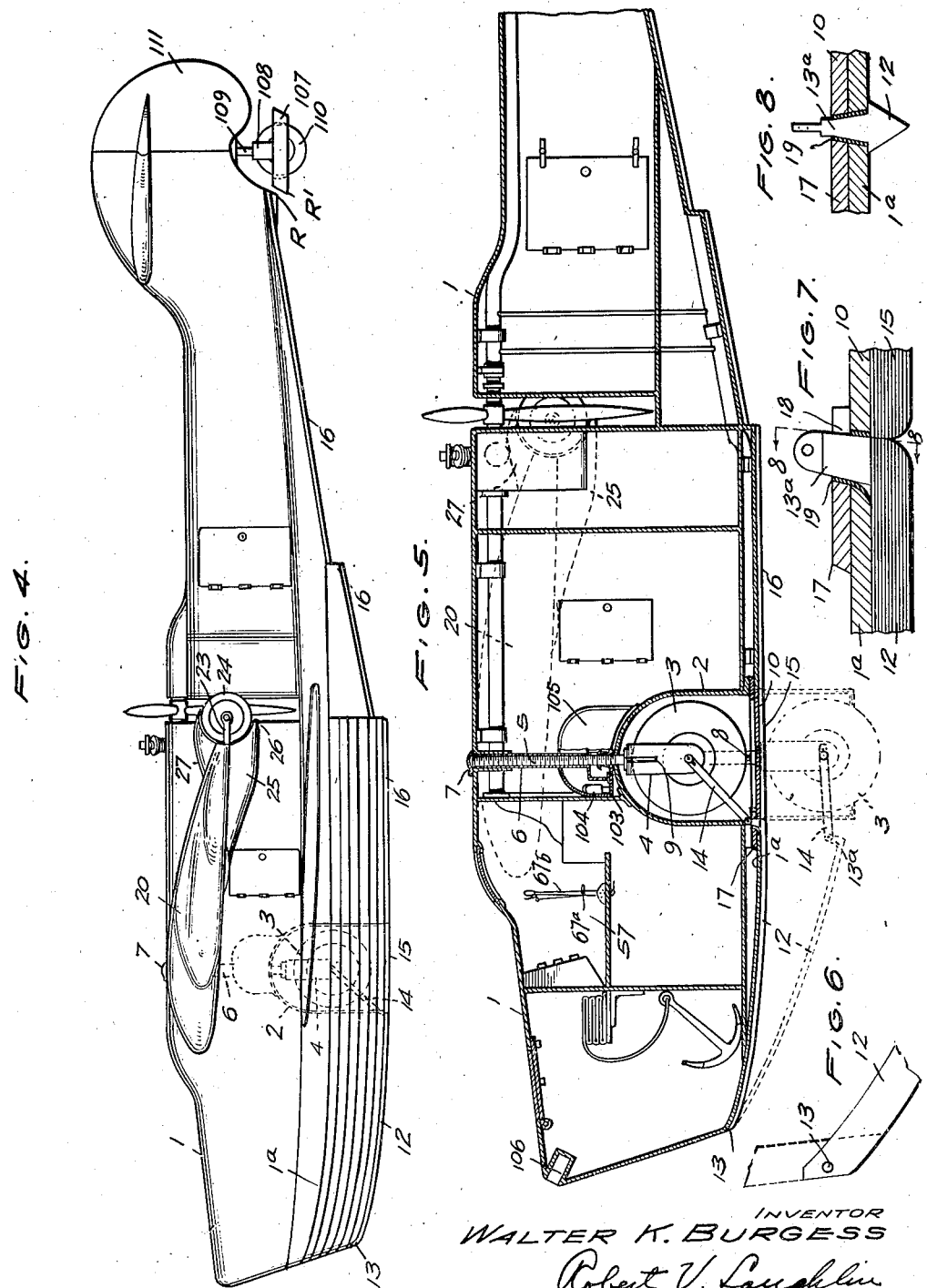

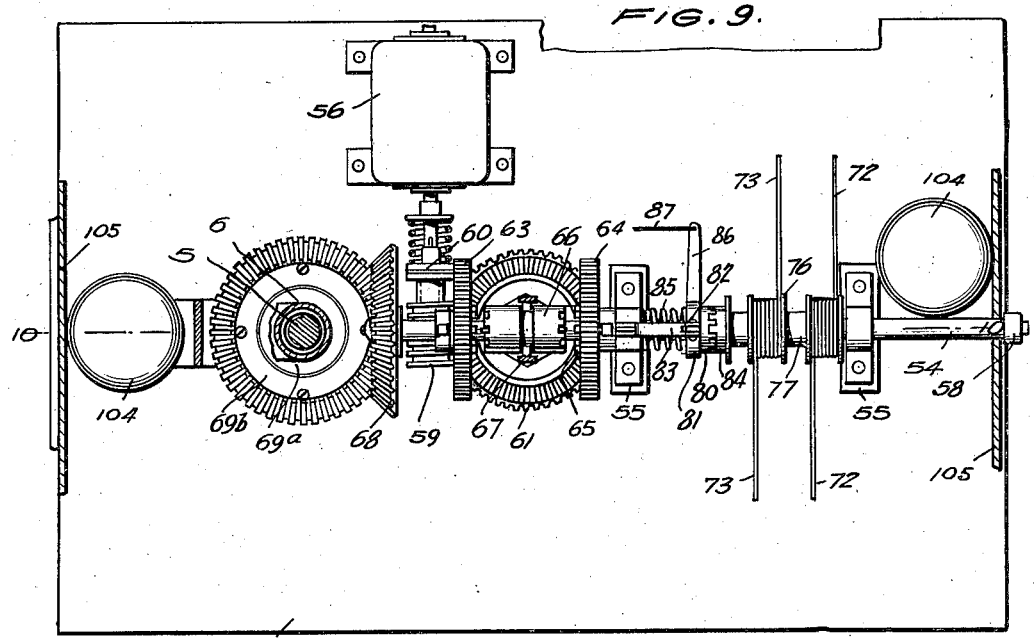

March 15, 1938. W. K. BURGESS 2,110,865
AMPHIBIAN AIRCRAFT
Filed Jan. 19, 1937 6 Sheets-Sheet 4
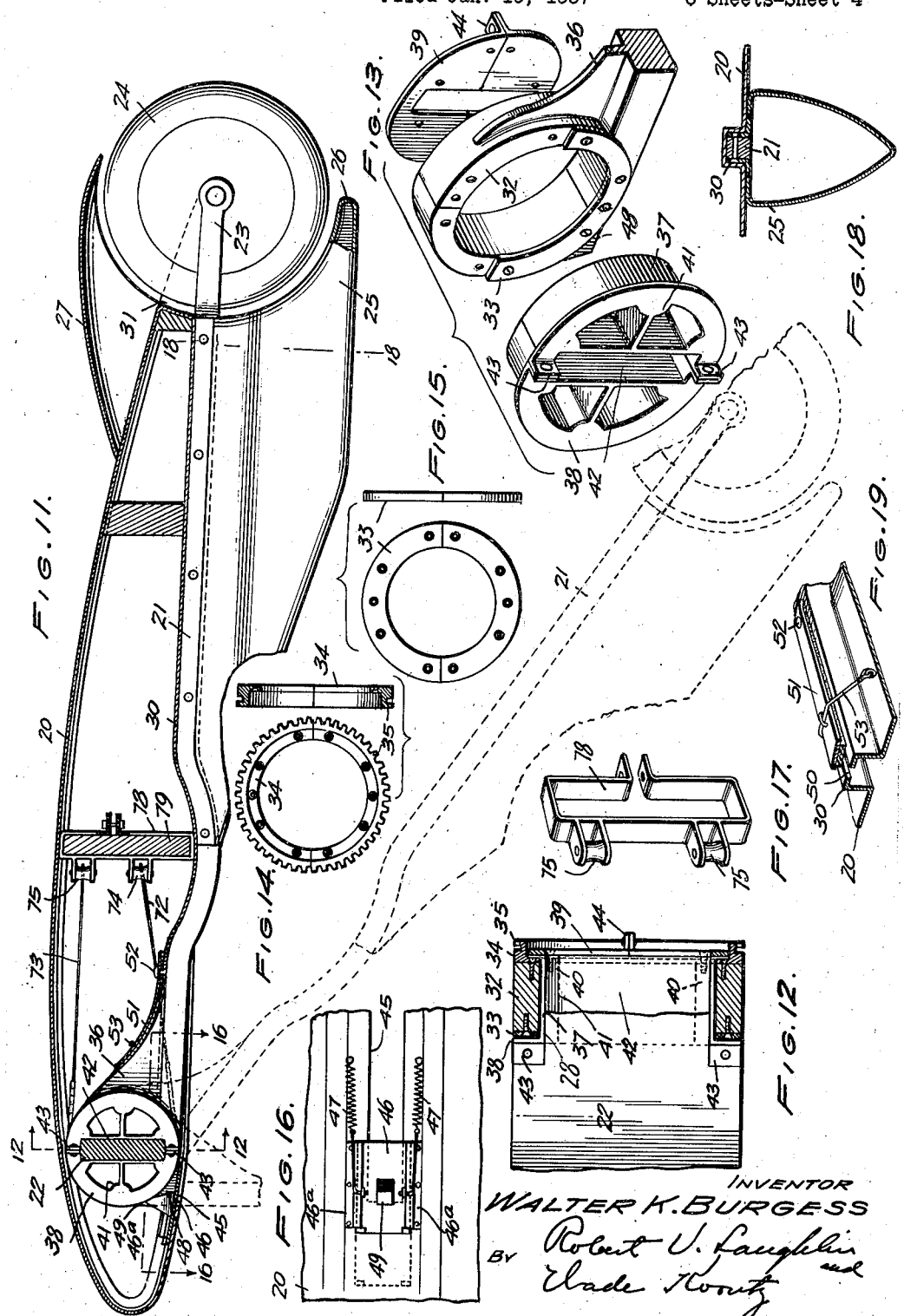
INVENTOR
WALTER K. BURGESS
BY Robert V. Laughlin
and Wade Koontz
ATTORNEYS

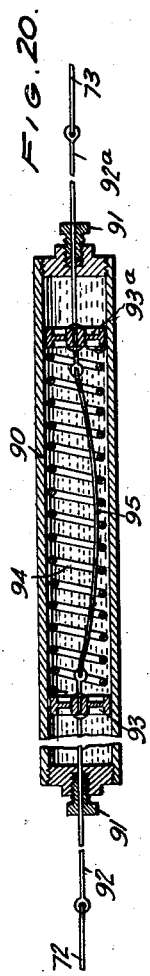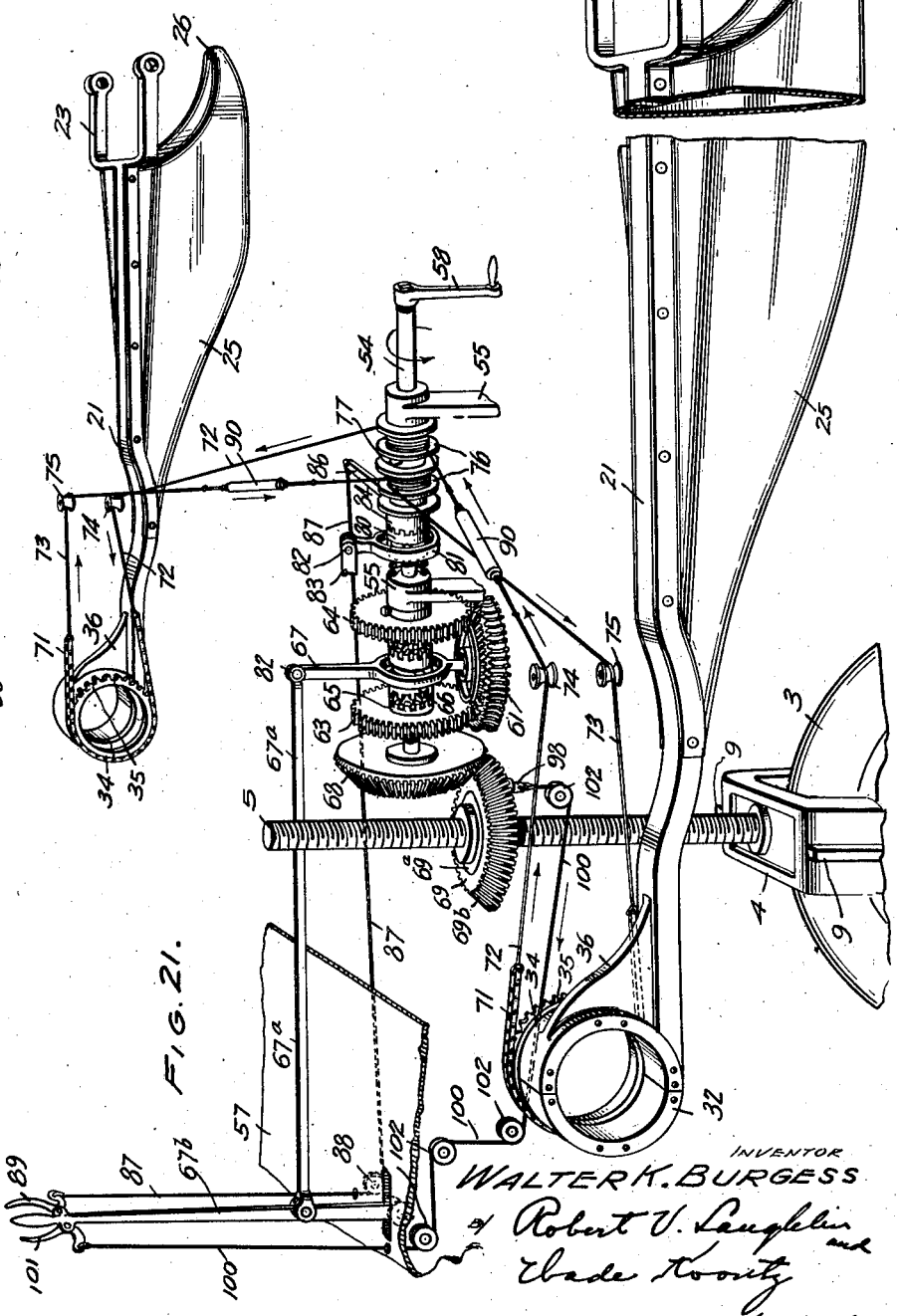

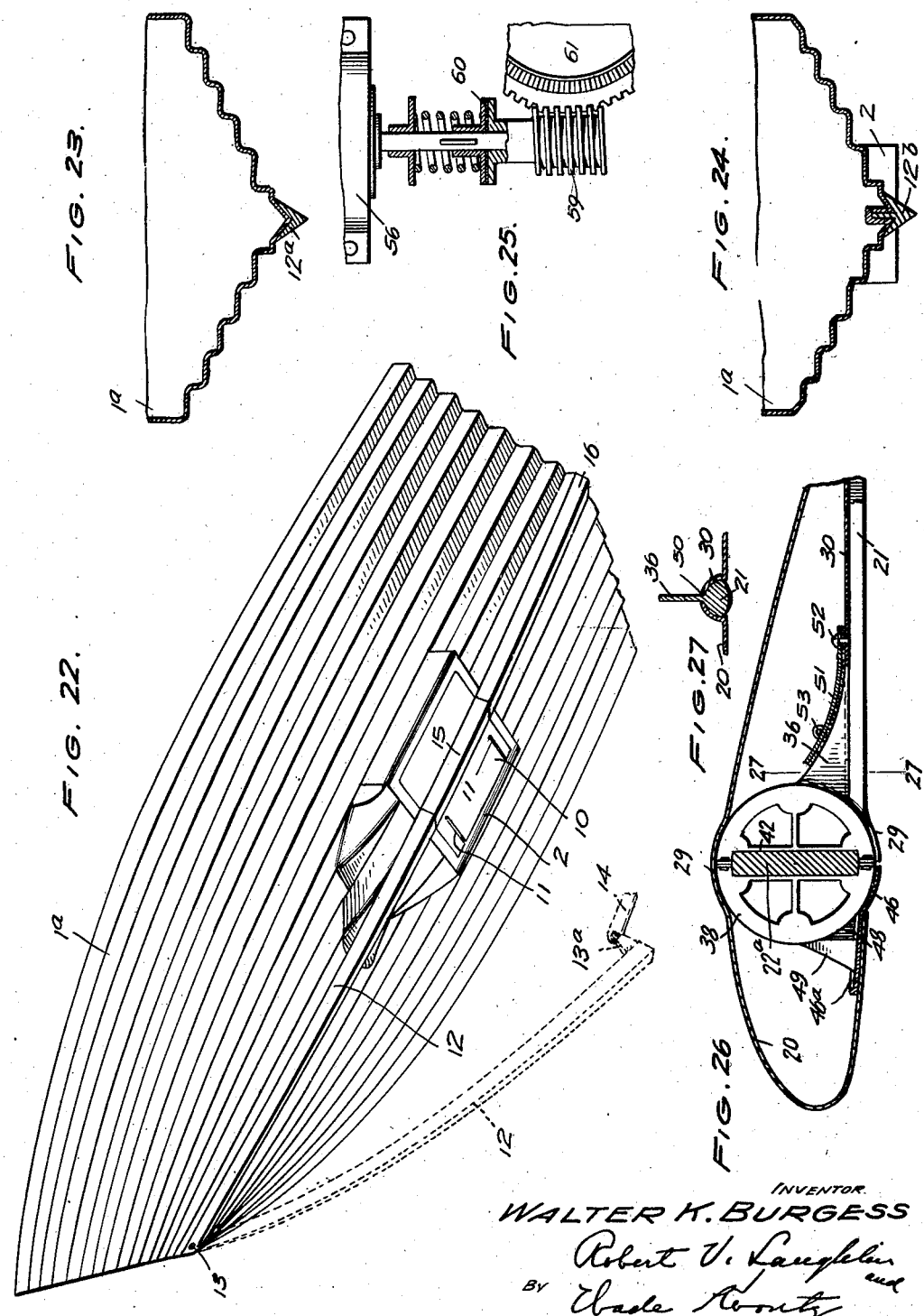

Patented Mar. 15, 1938

2,110,865

UNITED STATES PATENT OFFICE 2,110,865

AMPHIBIAN AIRCRAFT

Walter K. Burgess, March Field, Riverside, Calif.

Application January 19, 1937, Serial No. 121,308

17 Claims. (Cl. 244—102)

(Granted under the act of March 3, 1883, as amended April 30, 1928; 370 O. G. 757)

The invention described herein may be manufactured and used by or for the Government for governmental purposes, without the payment to me of any royalty thereon.

This application relates to landing gear for aircraft, particularly amphibian aircraft, and part of the novel subject matter disclosed and claimed herein, such as the wing tip wheels and floats and the center wheel and guard skid, will be found disclosed but not claimed in Patent No. 2,005,728, issued June 25, 1935, upon my prior application, Serial No. 637,775, filed October 14, 1932.

In addition to the foregoing, the present application discloses a mechanism for raising and lowering the landing gear elements having certain additional and novel features of construction and operation not disclosed in the earlier application and by the addition of which motion can be imparted and discontinued at will, either up or down, to the main landing gear element or center wheel.

Additional advantages and novel features of the herein disclosed subject matter will be apparent from the following detailed description of the invention, supplemented by the accompanying drawings, wherein:

Figure 1 is a top plan view on a small scale of a complete amphibian craft designed in accordance with the principles of the invention.

Figure 2 is an enlarged top plan view on a larger scale of the amphibian, with parts broken away.

Figure 3 is a vertical transverse section through the center landing wheel well.

Figure 4 is a side elevation of the amphibian with the tail oleo shock absorber down in the position occupied when the craft is afloat in sea.

Figure 5 is a vertical longitudinal section on line 5—5 of Figure 2.

Figures 6, 7, and 8 are detail views of the boat hull keel; Figure 8 being a section on line 8—8 of Figure 7.

Figure 9 is a top plan view, partly in section, of the landing gear operating mechanism.

Figure 10 is a vertical sectional view on line 10—10 of Figure 9.

Figure 11 is a section on line 11—11 of Figure 2.

Figure 12 is a section on line 12—12 of Figure 11.

Figure 13 is a detail perspective view of bearing assembly parts for the wing tip wheels and floats.

Figures 14 and 15 are detail views of side plate units of the bearing assembly.

Figure 16 is a section on line 16—16 of Figure 11 disclosing the wing slot closure.

Figure 17 is a perspective view of one of the pulley brackets.

Figure 18 is a cross section on line 18—18 of Figure 11.

Figure 19 is a detail view of weatherproof slot construction for the wing lower surface.

Figure 20 is a longitudinal sectional view of one of the outrigger shock absorbing devices.

Figure 21 is a detail perspective view of the landing gear assembly.

Figure 22 is a detail perspective view of the boat bottom.

Figures 23 and 24 are cross sections of the boat hull illustrating modified types of movable keel strips.

Figure 25 is a detail view of a slip friction clutch unit of the landing gear operating mechanism.

Figure 26 is a sectional view of a modified wing structure and lever arm bearing assembly and Figure 27 is a section on line 27—27 of Figure 26.

An amphibian aircraft, substantially of the novel type and design disclosed in the earlier application, is indicated in the accompanying drawings at 1 and, as illustrated, is a full decked sea craft embodying ideas from a speed boat combined with the seaworthy bow and forward decks of a cabin cruiser. The boat bottom or hull 1a, being a series of comparative planes perpendicular to each other, is shaped as shown clearly in Figure 22; the angles separating the horizontal and vertical sections of the boat bottom having their intersecting corners rounded to prevent both air and water resistance or drag, and permitting the boat hull to progressively break the suction in taking off.

Centered longitudinally and transversely of the craft and located near the bow thereof is a vertically disposed wheel well 2 in which is located the center or main landing wheel 3. This center wheel is journaled in a wheel fork 4 at the lower end of a screw shaft 5 and is adapted to be raised and lowered by the hereinafter described landing gear operating mechanism. In the fully raised position of the center landing gear, the wheel 3 is fully housed within the wheel well with the screw shaft received within a housing tube 6 as shown by the full line structure of Figure 5. The housing tube extends vertically from the top of the wheel well to the upper surface of the aircraft fuselage with the opening at its upper end normally closed by a spring-hinged cover cap 7. Guide means, such as channels or grooves 8 in the confining wall of the wheel well and runners or slides 9 on the wheel fork and traveling in the said channels or grooves, serve to brace and to steady the center landing wheel during the up and down movements of the latter. As shown in Figure 3, the wheel well is provided also with a sea tight self-closing door 10 hingedly connected along one side to the bottom of the wheel well by a spring hinge 11 which, in the elevated position of the landing gear, yieldingly holds the door closed. Since the door is disposed edge wise to the flow in its opened condition, it presents little or no flat plate area of parasite resistance.

A member 12 is hingedly connected at its forward end 13 to the bow of the fuselage hull to provide a movable keel strip or skid and is shaped to conform with the keel section of the hull so that it fits, in its raised position, snugly and closely against the hull as shown in full lines in Figures 4, 5, and 22. The movable keel strip extends aft from its hinge to the forward side of the wheel well and the aft end thereof is provided with an actuating horn 13a connected by suitable linkage 14 with the wheel fork of the center landing wheel whereby it is adapted to be moved up and down with the said wheel. This member 12, when in its down or lowered position, is of value as a skid when taxiing over stony, rough, or stumpy ground in that it will guide the nose of the craft up and over obstructions to the pneumatic tire of the center wheel and it serves also as a wheel guard which will prevent the carrying away of the wheel and gear (as would result in an unguarded wheel structure from a blow falling at or near the same horizontal plane as that passing through the wheel axle). The movable keel strip 12 is always depressed when the center landing wheel is down. Likewise, it is always up against the hull when the center wheel is drawn up into the wheel well and together with a keel segment 15 on the wheel well door and the stationary aft keel portion 16 of the hull forms a normally continuous boat hull keel.

This feature of having the forward keel portion movable up and down with the center landing wheel is of vital importance in case a landing, through mistake, should be made in water with the center landing wheel down. In such an event, the downwardly positioned keel strip 12 acts as a cut-water cable or forward bow to the wheel, opening a path for the wheel and preventing a disaster similar to those occurring with current amphibian designs when landing in water with the landing gear not drawn up. Alternate types of movable keel strips are illustrated in Figure 23 and Figure 24 at 12a and 12b respectively.

Figure 7 and Figure 8 illustrate a construction for sealing the landing wheel well door and making the boat bottom sea tight where the movable keel strip is actuated by the linkage 14. The wheel well door in its raised position forming a part of the boat bottom, closes against a frame 17 on the inside of the boat hull and is held thereagainst by pressure of its spring hinge. The door frame 17 overlaps the joint between the hull and door and, in common with the boat hull, has an open slot 18 through which the horn 13a and linkage 14 of the hingedly mounted keel strip pass into and out of the wheel well when moved up and down with the center landing wheel. Slot 18 is made water proof by a sea tight gasket 19 of rubber or other suitable material. The wheel well may be kept dry, also, by pump and by compressed air.

In order to meet a variable condition of sea, draft, or terrain, on which the amphibian may be landing, adjustable outrigger pontoons and outward landing wheels are provided. In the embodiment herein disclosed, these outboard floats and wheels are incorporated in the structure of the amphibian sustaining wing 20. This sustaining wing is a modified thick airfoil section throughout with its upper surface streamlining with and into the fuselage top or boat hull upper deck, with streamlining in the angles of junction of wing and fuselage. The wing-carried outrigger landing devices consist mainly of two lever arms 21 supported from the wing and laterally spaced apart so as to be on relatively opposite sides of and remote from the fuselage and hull in the direction of the wing tips. The lever arms extend fore-and-aft of the wing and at their forward or leading ends are hingedly mounted to turn about a horizontal axis substantially at the wing entering edge or preferably about the forward wing spar 22. Each arm, at its free and trailing end, is provided with a wheel fork 23 in which is mounted a landing wheel 24. A streamlined hollow body 25 is fixedly attached to the arm in advance of the landing wheel 24 and has a semi-circular wheel embracing, or fairing portion 26, which is complemental to a fairing or shield 27 on the wing whereby, in the fully raised position of the lever arm, the landing wheel carried thereby is shielded and streamlined on its lower side by the body 25 and on its upper side by the fairing or shield 27 as shown in Figure 11. In addition to streamlining the lever arm and its landing wheel while in flight, each hollow body forms with the latter the outrigger float or pontoon.

These wing tip float-and-wheel assemblies are designed and built into the wing structure either in the manner disclosed in Figure 11 or in accordance with the showing in Figure 26; the only material difference being that in Figure 11 the front wing spar is notched or recessed as indicated at 28 in Figure 12 to accommodate the lever arm bearing assemblies within the vertical dimensions of the spar whereas in Figure 26 the front spar 22a is unaltered and for its full vertical dimension is encompassed by the lever arm bearing assemblies with the wing covering necessarily limitedly domed laterally over the assemblies as shown at 29. In either case, each hingedly mounted arm in its fully raised position fits close up against the underside of the wing which is upwardly recessed or niched, as at 30, to accommodate the lever arm and notched, also, at 31 to provide clearance for the wheel fork and wheel.

A convenient and novel form of lever arm bearing assembly or hinge mounting is shown to advantage in Figures 8 to 11 inclusive. Each lever arm is provided at its wing spar engaging end with an offset circular strap 32 in two parts held together by flat side rings or plates 33 and 34 secured thereto by flat head machine screws or other suitable means; each side plate also being in two parts with the side plate 34 formed or provided with a sprocket 35. Each lever arm and its strap portion are reinforced at their junction by a structural strength web 36. In the installation of an outrigger landing gear lever arm, strap 22 thereof encircles and turns about a ring bearing 37 on the wing spar and is retained thereon against lateral displacement by a fixed flange 38 at one edge of the ring bearing and a detachable flange or plate 39 at the opposite edge; the latter being attached to the ring bearing by machine screws 40 or the like entering bosses 41 cast or otherwise provided on the ring bearing at the places illustrated. Bearing 37 is split into two sections with complemental rim and spider portions forming a rectangular socket 42 in which the wing spar 22 or 22a is firmly gripped when the ring bearing sections are bolted in place about the spar through the ears 43. Retaining plate 39, likewise, consists of two half sections bolted together through ears 44. The sectional construction of the lever arm strap and bearing facilitates the attaching and removing of the lever arm with respect to the wing spar.

The forward portion of each slot 45, shown in Figure 16 and required in the underside of the wing below the front spar for the free movement of each lever arm, is made weatherproof in each instance by means of a closure plate 46 conforming to the wing curvature and slidable in guides 46a. The closure plate is held close against the underside of the lever arm strap by a pair of springs or other elastic elements 47. A pusher element, such as a raised projection or lug 48 on the lower forward face of the lever arm strap, contacts with an abutment 49 on the upper side of the closure plate and pushes the latter forwardly against the resistance of the elastic elements as the lever arm is swung downwardly. During the movement of the lever arm upwardly from its lowered or extended position and by reason of the pull exerted by the elastic elements, the closure plate is drawn rearwardly over the slot to cover the same as it is vacated by the receding portions of the lever arm.

The slot 50 required in the upwardly recessed part 30 of the wing bottom, as shown to advantage in Figure 19, to permit passage therethrough of the structural strength web 36 on the lever arm is made weatherproof by means of a flat thin strip 53 of spring steel on the inside of the wing and arranged over the slot to cover the same with one end secured to the wing bottom as shown at 52 and its other or free end overlying the web. An elastic cord 53, the ends of which are fastened to the wing bottom, straddles the flat strip near its free end and is preferably secured thereto in the manner illustrated. By this arrangement, the spring strip is adapted to have its free flexible portion displaced upwardly of the slot and riding the upper curved edge of the structural strength web whenever the lever arm is in its raised or retracted position against the wing; the elastic cord 53 aided by the inherent resiliency of the spring strip functioning to draw the strip downwardly over the slot as the latter is vacated by the web during the downward or lowering movement of the lever arm. Strip 53 may be faced on its underside with rubber or other suitable material as shown to more effectively seal the opening.

By providing two weatherproofing assemblies for each lever arm, such as shown in Figures 16 and 19 respectively, no water spray or air pressure force of any consequence can enter the wing through the lower wing surface during the actuation of the outrigger landing gear since, by reason of the closure arrangements described, the continuity of the lower wing surface remains substantially unbroken while extending and retracting the landing gear and the aerodynamic efficiency of the wing is unimpaired.

The mechanism for raising and lowering the center and outrigger landing gear elements is illustrated in detail in Figures 9 and 10 and diagrammatically in Figure 21. It includes a horizontal main shaft 54 supported in bearing brackets 55 and rotated either mechanically by an electric motor 56 with the controls in the pilot's cockpit or cabin 57 or manually by a hand crank 58 at one end of the shaft; the hand crank being so constructed as to become operatively coupled with the shaft only when pushed in against the resistance of a spring (not shown). The hand crank is provided for emergency use only and is resorted to in event of failure of the electric motor. The motor 56 is coupled to and drives a short worm shaft 59 through a friction clutch 60 (see Figure 25) which is adapted to slip at a given undesirable torque to prevent injury to the motor; shaft 59 being in mesh with and driving worm gear 61 supported on a suitable bearing 62 for rotation about a vertical axis. The worm gear drives a pair of clutch gears 63 and 64 idling on shaft 54 and in constant mesh with the worm gear to be oppositely rotated thereby. The clutch gears are provided upon their inner or confronting faces with clutch segments 65 for engagement with complemental clutch segments at opposite ends of a clutch sleeve 66; the latter being mounted to slide longitudinally on the shaft 54 between the clutch gears but fixed to the shaft for rotation therewith. A pivotally mounted yoke 67, operated by link connection 67a with control lever 67b in the pilot's cabin, is connected with the clutch sleeve for sliding the latter into and out of engagement with either of the clutch gears. When the clutch sleeve is engaged with clutch gear 63 the shaft 54 is rotated in one direction and when the clutch sleeve is engaged with the clutch gear 64 the shaft is rotated in the reverse direction.

The motion of shaft 54 is transmitted to the center landing gear unit by means of a bevel gear 68 fixed on the shaft and in mesh with a nut gear 69 on the screw shaft 5, the hub or nut portion of the gear 69 being in screw-threaded engagement with the screw shaft. The nut gear is restrained against displacement from a fixed location in the assembly by the abutment of tube 6 and gear 68 on the top side and the support bearing or boss 70 on the bottom side. Hence, turning of the gear or nut 69 on the screw shaft 5 will cause the screw shaft, and hence the center landing wheel 3 and the keel strip 12, to be raised or lowered in accordance with the direction and magnitude of turn imparted to the gear 69.

The outrigger landing gear elements, also, are operated from the shaft 54. To this end, the sprocket 35 of each lever arm is engaged with a short sprocket chain 71. These chains are coupled by separate cables 72 and 73 so that the upper terminal of each chain is connected to the lower terminal of the other chain as shown in Figure 21; cable 72 passing around a pair of guide pulleys 74 and cable 73 passing around a pair of guide pulleys 75. These cables also wind around separated spool portions 76 of a winding drum 77 idling on shaft 54, the winding of the cables being such that the two lever arms 21 move simultaneously in the same direction. Each pair of guide pulleys is mounted on and supported by a loop bracket 78, shown in Figure 17, which is adapted to be clamped about an inner wing spar 79 in the manner illustrated in Figure 11. In order that the winding drum may be thrown at will into and out of gear with the shaft 54, a clutch element 80 is mounted to freely slide longitudinally of the shaft between the shaft-bearing 55 and the adjacent end of the winding drum but is fixed to the shaft to revolve therewith. A yoke 81 swingably suspended from a point 82 above the shaft by pivotal connection with a hanger bracket 83, is connected with clutch element 80 for moving the latter into and out of engagement with clutch segments 84 on the winding drum; the clutch member 80 normally and yieldingly held in engagement with the drum-carried clutch segments by the thrust of a spring 85. The clutch yoke has a depending arm 86 to which is attached one end of a cable 87 which, after passing around guide pulley 88, is attached at its other end to a bell-crank lever or handgrip 89 pivotally mounted on the main control lever 67b. Arm 86 is preferably directed obliquely as shown to dispose the cable 87 clear of the various gears and other parts of the mechanism. Rocking or tilting the handgrip about its axis in a direction pulling cable 87 upwardly and yoke arm 86 forwardly, or to the left in Figure 10, withdraws clutch member 80 from engagement with the winding drum and compresses spring 85. The drum then idles on the shaft 54. When the handgrip is released, the clutch is reengaged by the thrust of the spring and the drum rotates with the shaft. The clutch thus serves as a throw-out mechanism for the outrigger landing unit whereby the latter may be caused to remain stationary while raising or lowering the center landing unit, if so desired.

To provide flexibility of the outrigger landing units and to absorb the shocks imparted thereto by impact with rough uneven ground or choppy sea, the outboard landing gear control cable 72 and 73 are provided with hydraulic shock absorbers. The shock absorbers consist, respectively, of a cylinder 90 filled with oil and having closed ends provided with packing glands 91 through which slide the plunger rods 92 and 92a of plungers 93 and 93a. The plungers are yieldably connected together by an intervening coupling spring 94 and by a slack cable 95. Each shock absorber unit is connected at one end with cable 72 and at its other end with cable 73.

In the normal operation of the landing gear lowering and raising mechanism, that is with all the clutches engaged, the center landing gear unit and the outrigger landing gear units move jointly up and down and the movement can be discontinued at any point in the up and down travel of the gear by placing the clutch sleeve 66 in neutral position with respect to the clutch gears 63 and 64 and, thus, breaking the driving connection between the motor 56 and the shaft 54. Arms 21 move through arcs of 90 degrees when fully raised or lowered and when the outrigger landing units are lowered jointly with the center unit a tri-wheel landing gear is provided in which the outrigger wheels 24 are disposed rearwardly and laterally of the center wheel 3. It may be desirable at times, however, to operate the outrigger landing gear without any corresponding movement of the center landing gear as, for example, when making water landings. The landing gear operating mechanism therefore includes novel means for cutting out the center landing gear whenever desired. For this purpose, the previously referred to nut-gear 69 is composed of a central hub or nut section 69a in screw threaded engagement with screw shaft 5 and an outer rim or peripheral gear section 69b in mesh with the driving gear 68 of shaft 54. The gear section is movable around the hub and the latter rotates with the gear section only when positively coupled therewith by the engagement of a coupling pinion 96 with the teeth of a circular rack or gear 97 on the underside of the hub and rim; the rack or gear being so apportioned between the two that each tooth of the rack or gear has one segment thereof on the hub and the other segment on the rim. Pinion 96 is journaled in a cradle 98 resiliently supported in boss 70 upon coil spring 99 by means of which it is normally and yieldably held in contact with the rack 97. To the underside of the cradle is attached one end of a pull cable 100 which has its other end attached to the lower arm of a small bell-crank lever or handgrip 101 pivotally mounted on the control lever 87b. Guide pulleys 102 support the pull cord at appropriate places. By rocking or squeezing the handgrip to exert a pull on the cord and cradle, the latter is lowered against the resistance of the cradle spring and withdraws the coupling pinion from contact with the rack. In this position of the parts, the rim 69b of gear 69 will turn freely on the hub 69a when driven from gear 68. There being no driving connection at this time, however, between the rim and the hub, the latter is not turned on the screw shaft 5 and hence no up and down movement is imparted to the latter. It is apparent that, by means of this arrangement, movement of the center landing gear can be started and stopped at will.

The tube 6, motor 56, and drive shaft 54, together with the associated gears, bearings, etc., are mounted on a common support provided by a table or platform 103 which is yieldably suspended by hydraulic shock absorbers 104, the stationary elements of which are suitably fastened to the side walls of a casing or shield 105 in which the landing gear operating mechanism is substantially enclosed.

The landing gear may be raised or lowered to any position that the pilot believes will best suit a given condition of wind and sea or landing terrain. In making a landing, whether upon water or land, the desired amount of wing wheel or pontoon depression may be selected and that amount used just when desired. It is not necessary to glide to a landing either upon water or land, with wheels and floats down. When in a rough and choppy sea the best combination of the outrigger stability principle is provided and made available that, in the judgment of the pilot, is suited to a particular wind and sea condition. In case of a forced landing on the sea, a sailing mast socket is available by raising the hinged cover cap 7 of the screw shaft tube 6. A socket for a bow sprit is also provided at 106. When the craft is under sail or lying without power in a wind or rough sea, the center landing wheel may be depressed to serve as a center board affording extra keel area. For directional guidance on water, the tail unit of the landing gear includes a streamlined rudder 107 joined by a yoke 108, equipped with oleo shock absorbers, to the rudder post 109 and having a central opening in which is journaled the tail-wheel 110. By reason of its connection with the rudder post, the sea rudder is synchronized with the air-rudder 111 and is operated by the air-rudder controls. The showing in Figure 4 illustrates the position assumed by the craft in the sea with the sea rudder down. On land, points "R" and "R'" are in the same plane. A landing gear designed and constructed as herein described presents many advantages of use and operation not common to conventional landing gear.

Having thus fully described and pointed out the invention, what is claimed as new and novel is:

1. In an amphibian, in combination, a boat hull fuselage, a landing wheel carried thereby and movable upwardly and downwardly with respect thereto, means for depressing and raising the said wheel, and a keel skid secured to the keel of the boat hull fuselage forwardly of the said wheel, said keel skid being hingedly connected at its forward end to the keel and at the rearward end being connected with the wheel so as to be raised and lowered simultaneously with the wheel.

2. An aircraft having a center landing device and outrigger landing devices movable to and from extended and retracted positions, and means for extending and retracting same including reversely rotated gears, a shaft, pilot-controlled means for placing said gears selectively in and out of driving relation with said shaft and separate power transmitting means between the said shaft and the said landing devices for converting the rotatory motion of the shaft to up and down motion of the said devices.

3. An aircraft having a center landing device and outrigger landing devices movable to and from extended and retracted positions, and means for extending and retracting same including reversely rotated gears, a shaft, pilot-controlled means for placing said gears selectively in and out of driving relation with said shaft and separate power transmitting means between the said shaft and the said landing devices for converting the rotatory motion of the shaft to up and down motion of the said devices, each of said separate power transmitting means including a pilot controlled cut-out mechanism for disconnecting the landing device therefrom.

4. An aircraft landing device comprising a pair of reversely rotated gears, a rotatable shaft, pilot-controlled means for connecting said shaft with said gears selectively whereby said shaft is rotated, a plurality of landing devices mounted for up and down movement to and from extended and retracted positions, separate actuating mechanism associated with each landing device and adapted when actuated to impart movement thereto, and pilot-controlled means for coupling said separate actuating mechanisms singly or jointly with said shaft for actuation thereby.

5. An aircraft landing gear comprising a pair of outrigger landing devices hingedly mounted for up and down swinging movements, a central landing device mounted for vertical up and down linear movements, a power shaft, pilot-controlled means for imparting rotation to said shaft, and separate pilot-controlled means for transmitting the motion of the shaft to the said outrigger and central landing devices respectively for effecting the up and down movements thereof, the motion transmitting means for the outrigger landing devices comprising a winding drum free on said shaft, a pilot-controlled clutch mechanism for connecting said drum to said shaft to be rotated thereby, and cables connected with the outrigger landing devices and winding around said drum to cause said outrigger landing devices to be moved simultaneously in the same direction when the said drum is rotated.

6. An aircraft landing gear comprising outrigger landing devices hingedly mounted for up and down swinging movements, a central landing device mounted for vertical up and down linear movements, a power shaft, pilot-controlled means for imparting rotation to said shaft, and separate pilot-controlled means for transmitting the motion of the shaft to the said outrigger and central landing devices respectively for effecting the up and down movements thereof, the motion transmitting means for the central landing device comprising a vertically disposed screw shaft on the central landing device, a non-travelling nut on said screw shaft, a gear fixed on said power shaft, and a pilot-controlled clutch mechanism for connecting said nut with said gear to be rotated thereby.

7. In an aircraft landing gear, the combination with a hollow supporting wing having a slot and a shallow reentrant portion in its bottom surface, the slot being near the leading edge of the wing and the reentrant portion extending fore-and-aft of the wing from the slot to the trailing edge of the latter and at its forward end having communication with the interior of the hollow wing through the said slot in the wing bottom, of a lever arm extending through the said slot and hingedly connected at its inner end to and internally of the wing structure for vertical swinging movement to and from positions of extension and retraction with respect to said wing, said arm in its retracted position against the wing bottom being housed in the said reentrant portion of the latter, a landing device at the free end of said arm, a movable closure member mounted on said wing, and automatic means for moving said closure member to and from covering position over the said slot as the said arm is retracted and extended.

8. In an aircraft landing gear, a wing having a wheel-slot in its trailing edge, a wheel-fairing on the upper side of the wing and over the said wheel-slot, a lever arm disposed in the fore-and-aft direction of the wing and on the underside thereof, said arm being hingedly connected at its forward end to the wing for swinging movement downwardly from and upwardly against the undersurface of the wing, a landing wheel at the free end of the arm and adapted to extend partly above and partly below the said wing wheel slot in the fully raised position of the arm, and a float attached to said arm in advance of said wheel and having a wheel-embracing portion complemental to the said wheel-fairing of the wing whereby in the fully raised position of the arm the said wheel is shielded on its upper side by the wing-carried wheel fairing and on its lower side by the wheel-embracing portion of the said float.

9. In an aircraft landing gear, the combination with separate landing devices of an operating mechanism therefor comprising a pilot-actuated main control lever, a pilot-controlled power means including reversely rotated drive gears, a power shaft, a clutch operatively connected with the main control lever to be actuated by the pilot for placing the power shaft in and out of gear selectively with the reversely rotated gears, pivoted handgrips on said main control lever, and separate power transmitting means for transmitting the motion of the power shaft to the separate landing devices for effecting operation of the latter, each of said separate power transmitting means including a clutch operatively connected with a selected handgrip to be actuated by the pilot for placing the power transmitting means in and out of operative relation with said power shaft, the said handgrips being closely grouped and positioned on the control lever to be separately and jointly operated with and independently of the main control lever.

10. An amphibian aircraft having a boat hull provided with an upwardly extending and centrally located wheel-well opening downwardly through the bottom of the hull, a wheel fork in said wheel well mounted for vertical up and down movement to and from positions outwardly and inwardly of the wheel well, a landing wheel carried by said wheel fork and adapted in the fully up position of the fork to be housed in said wheel well, a movable keel strip hingedly connected at its forward end to the bow of the said hull and extending aft from its hinged forward end to the forward side of the wheel well with its aft end connected by linkage with the wheel fork to be moved up and down with the wheel.

11. An amphibian aircraft having a boat hull provided with an upwardly extending and centrally located wheel-well opening downwardly through the bottom of the hull, a wheel fork in said wheel well mounted for vertical up and down movement to and from positions outwardly and inwardly of the wheel well, a landing wheel carried by said wheel fork and adapted in the fully up position of the fork to be housed in said wheel well, a movable keel strip hingedly connected at its forward end to the bow of the said hull and extending aft from its hinged forward end to the forward side of the wheel well with its aft end connected by linkage with the wheel fork to be moved up and down with the wheel, and a door for closing the wheel well opening and hingedly mounted on the well to swing open and shut as the wheel is lowered and raised, said door being provided on its outer side with a keel section adapted in the closed position of the door to form a continuation of the movable keel strip.

12. In an aircraft, a sustaining wing of thick airfoil section, a ring bearing on the front wing spar, a strap mounted to turn about said ring bearing, a landing strut at the underside of the wing and integrally connected at one end to the said strap, and means for turning the strap to swing the strut to and from a horizontal position up against the underside of the wing from and to a substantially vertical position downwardly of the wing.

13. In an aircraft, a sustaining wing of thick airfoil section, a split ring bearing on the front wing spar composed of two sections with complemental rim and spider portions providing a socket therebetween for the said wing spar, a sectional circular strap encircling the ring bearing and mounted to turn about the same, a landing strut at the underside of the wing and integrally connected at one end to the said strap through an opening in the underside of the wing below the said wing spar, and means for turning the strap to swing the strut downwardly from and upwardly against the underside of the wing.

14. In an aircraft, a sustaining wing of thick airfoil section, a ring bearing fixed to and encircling a spar of the wing for substantially the full vertical dimensions of the spar, a strap encircling said bearing and mounted to turn about the same, a landing strut below the wing and integrally connected at one end to the said strap, and means for turning the strap to swing the strut downwardly from and upwardly against the underside of the wing, said means including a sprocket on the said strap and an operating chain engaged with the sprocket.

15. An amphibian aircraft having a unit boat hull and airplane fuselage structure provided centrally of the hull with a vertical downwardly opening wheel well, a landing gear including a vertically adjustable wheel fork in said well, a keel strip hinged at its forward end to the bow of the fuselage hull and extending aft from its hinge to the forward side of the wheel well, and a link connecting the aft end of the keel strip with the wheel fork whereby it is adapted to be moved up and down with the wheel fork to be up against the keel section of the hull in the fully raised position of the wheel fork and to be inclined downwardly from the hull and in front of the wheel fork in the lowered position of the latter, said keel strip being shaped to conform with the keel section of the hull so that in its fully raised position it fits snugly and closely against the hull.

16. In an aircraft, a sustaining wing of thick airfoil section, a ring bearing on the front wing spar, a strap mounted to turn about the said ring bearing, a landing strut at the underside of the wing and integrally connected at one end to the said strap, a wheel at the free end of the said strut, a streamlined hollow body fixedly mounted on the said strut forwardly of the said wheel and forming a pontoon, and means for turning the strap and swinging the strut to raise and lower the wheel and pontoon with respect to the said wing.

17. In an aircraft, a body having a recess in its underside, a landing gear strut hinged in the recess for swinging movement upwardly and downwardly with respect to the said body, a closure member mounted on the said body and movable to and from covering position over the said recess, elastic means connected with the said closure member for yieldably holding the latter in covering position over the recess, an abutment on the upper side of the said member, and a pusher element carried by the said strut for contacting the said abutment to move the closure member against the resistance of the elastic means from its covering position over the said recess as the strut is moved downwardly of the body.

WALTER K. BURGESS.